United States Patent [19]

Hiraga

[11] 4,042,309

[45] Aug. 16, 1977

[54] REFRIGERANT COMPRESSOR

[75] Inventor: Masaharu Hiraga, Isesaki, Japan

[73] Assignee: Sankyo Electric Company, Limited, Isesaki, Japan

[21] Appl. No.: 608,002

[22] Filed: Aug. 26, 1975

[30] Foreign Application Priority Data

Aug. 26, 1974 Japan .................. 49-102116[U]
Aug. 26, 1974 Japan .................. 49-102117[U]

[51] Int. Cl.² .................. F04B 1/12; F16C 33/46; F16C 33/58
[52] U.S. Cl. .................. 417/269; 308/235
[58] Field of Search .................. 417/269; 308/207 R, 308/216, 235; 74/60

[56] References Cited

U.S. PATENT DOCUMENTS

| 926,966 | 7/1909 | Shirley | 308/216 |
|---|---|---|---|
| 1,380,622 | 6/1921 | Winn | 308/235 |
| 2,055,524 | 9/1936 | Ellis | 308/235 |
| 2,845,311 | 7/1958 | Cobb | 308/216 |
| 3,552,886 | 1/1971 | Olson | 417/269 |
| 3,712,759 | 1/1973 | Olson | 417/269 |

Primary Examiner—Carlton R. Croyle
Assistant Examiner—G. P. LaPointe
Attorney, Agent, or Firm—Hopgood, Calimafde, Kalil, Blaustein & Lieberman

[57] ABSTRACT

A refrigerant compressor in a wobble type suitable for air-conditioning systems for automobiles, in which pistons are reciprocated within respective cylinders by a wobble plate member driven by a wedge-shaped rotor member which is secured on a drive shaft. Needle thrust bearing assemblies are disposed between an inner surface of an end plate of a compressor housing and an end surface of the wedge-shaped rotor member and between an inclining end surface of the wedge-shaped rotor member and an end surface of the wobble plate member. Wear-resistant ring members are disposed in respective two of annular recesses formed in the end plate, the wedge-shaped rotor member and the wobble plate member, in which pairs of a race member and a needle roller cage assembly of the needle thrust bearing assemblies are received, and the other race members of the bearing assemblies are so disposed in the other annular recesses that the rotating movement thereof in the recesses may be prevented, whereby the end plate, the wedge-shaped rotor member and the wobble plate member may be protected from wearing during operations of the compressor. The ring members that are and the race members disposed in the same recesses as the ring members may be integratedly formed as one bodies.

9 Claims, 13 Drawing Figures

REFRIGERANT COMPRESSOR

BACKGROUND OF THE INVENTION

This invention relates to fluid compressors and, more particularly, to improvements of refrigerant compressors of the wobble type in which pistons are reciprocated by a wobble plate driven by a rotor which is secured on a drive shaft.

A wobble type compressor of this type is described in U.S. Pat. No. 3,552,886 (which is reissued under U.S. Pat. No. Reg. 27,844). In such a compressor, the rotor is formed in the form of a wedge and is sandwiched between the wobble plate and a front plate which rotatably supports the drive shaft. The wobble type compressor is small in volume and is suitable for refrigeration systems of the automotive or mobile type.

The compressor shown in the above described U.S. patent is provided with two anti-friction or roller thrust bearing assemblies. One of the thrust bearing assemblies is disposed between an end plate of the compressor housing and the rotor to take up thrust load on the rotor as will appear. And the other bearing assembly is disposed between the rotor and the wobble plate. Accordingly a frictionless driving of the wobble plate is provided. When the compressor is driven by an engine system mounted on the automobile, it is not avoidable that the rotating speed of the drive shaft varies momentarily. Accordingly, the race members of the thrust bearing assemblies readily slip and rotationally move on seated parts, which parts, therefore, are worn out.

Furthermore, by the rotation of the rolling element or needle roller and the cage assemblies of the anti-friction thrust bearing assemblies during the operation of the compressor, the rolling element cage assemblies wear out parts which contact therewith.

Accordingly, it is required to use hard materials such as steel as the end plate, the rotor member and the wobble plate member. But this increases the weight of the compressor.

SUMMARY OF THE INVENTION

It is therefore a general object of this invention to provide a wobble type compressor having a small size and a prolonged life time, which is light in weight.

It is another object of this invention to provide a wobble type compressor with improved arrangements of antifriction thrust bearing assemblies between the end plate member and the rotor member and between the rotor member and the wobble plate member to prevent those members from wearing due to the rotating movement of the race members and rolling element cage assemblies of the anti-friction thrust bearing assemblies.

It is still another object of this invention to provide a wobble type compressor which is easy to fabricate and cheap in cost, while realizing the above objects.

It is yet another object of this invention to provide a wobble type refrigerant compressor which is more suitable for air-condition systems for automobiles.

According to this invention, a refrigerant compressor of the wobble type in which pistons are reciprocated within respective cylinders by a wobble plate member driven by a wedge-shaped rotor member which is secured on a drive shaft, includes a generally cylindrical housing which contains the wobble plate member and the wedge-shaped rotor, an end plate mounted on, and closing, an end of the housing, the drive shaft being rotatably borne in the end plate and extending from the exterior to the interior of the housing, the wedge-shaped rotor member being mounted and fixed on an inner end portion of the drive shaft to be rotated together with the drive shaft, a first anti-friction thrust bearing assembly being disposed between an inner end surface of the end plate and one end surface of the wedge-shaped rotor member and within a first annular space which is defined by a first annular recess formed in the inner end surface of the end plate and a second annular recess formed in the one end surface of the wedge-shaped rotor member, the wobble plate member being closely and relatively rotatably borne on the other end surface of the wedge-shaped rotor member, the other end surface being formed to incline to said drive shaft, and a second anti-friction thrust bearing assembly being disposed between the inclining or angular end surface of the wedge-shaped rotor member and an end surface of the wobble plate member facing the inclining end surface and within a second annular space which is defined by a third annular recess formed in the inclining surface of the wedge-shaped rotor member and a fourth annular recess formed in the end surface of the wobble plate member, which compressor is characterized in that each of the first and second antifriction thrust bearing assemblies comprises two race members and a rolling element cage assembly, one of the two race members and the rolling element cage assembly of the first bearing assembly being disposed in one of the first and second annular recesses which is formed with a sufficient depth such that the race member and the rolling element cage assembly seated therein may be prevented from a radial displacement and which is provided with a first ring member of a wear-resistant material therein which covers a radial inner wall defining the one annular recess, the other race member of the first bearing assembly being disposed in the other of the first and second annular recesses which is formed with a relatively shallow depth such that the other race member seated therein may be prevented from a radial displacement, with means being provided for preventing the other race member from rotating movement in the other annular recess.

The compressor is further characterized in that one of the two race members and the rolling element cage assembly of the second bearing assembly are disposed in one of the third and fourth annular recesses which is formed with a sufficient depth that the race member and the rolling element cage assembly seated therein may be prevented from a radial displacement and which is provided with a second ring member of a wear-resistant material therein which covers a radial inner wall defining the one annular recess, and the other race member of the second bearing assembly being disposed in the other of the third and fourth annular recesses which is formed with a relatively shallow depth such that the other race member mounted therein may be prevented from a radial displacement, with means being provided for preventing the other race member from rotating movement in the other annular recess.

Each of the first and second anti-friction thrust bearing assemblies may be a needle thrust bearing comprising two race members of wear-resistant material plates and a needle roller cage assembly.

Each of th first and second ring members may be made of cast iron which was subjected to a surface hardening treatment. The wedge-shaped rotor member and the wobble plate member may be made of aluminum. Each of race members of said first and second thrust bearing assemblies may be made of a carbon tool steel.

The first ring member and the one of two race members of the first bearing assembly may be integrally formed of a wear-resistant material as a first part of one body, and first means are provided for preventing said first part from rotating movement in the annular recess in which the part is disposed.

Similarly, the second ring member and the one of two race members of the second bearing assembly may be integrally formed of a wear-resistant material as a second part of one body, and second means are provided for preventing said second part from rotating movement in the annular recess in which the second part is disposed.

Further objects and features of this invention will be understood from following descriptions in connection with embodiments of this invention referring to the annexed drawings.

DETAILED DESCRIPTION OF PREFERRED EMBODIMENTS

Figure 1:
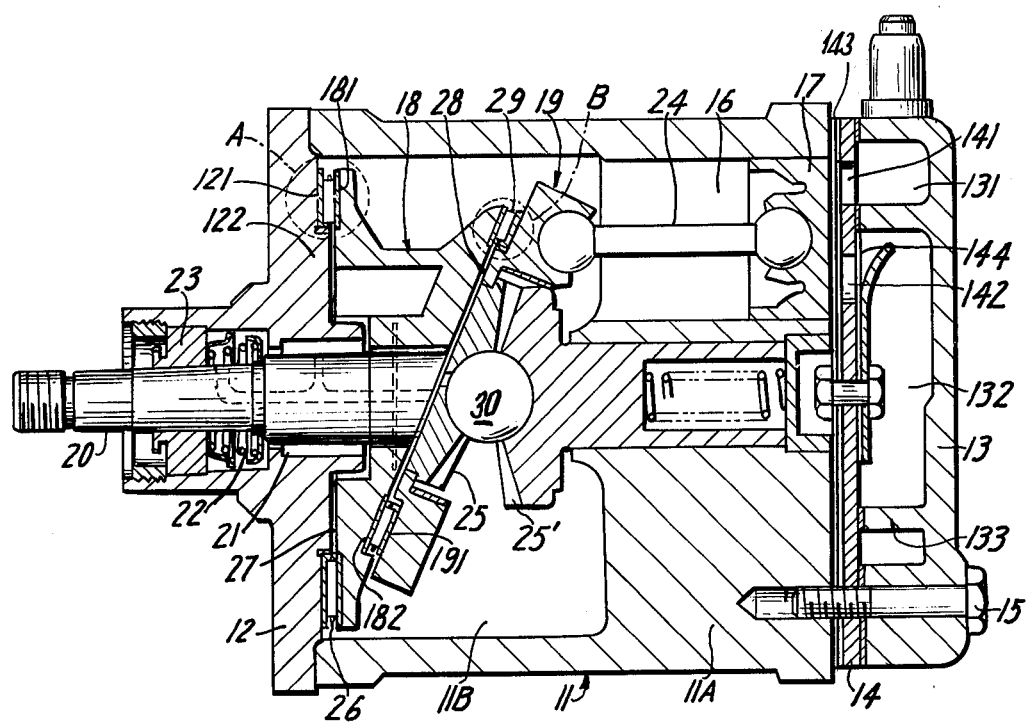
FIG. 1 shows a sectional view of an embodiment of this invention.

Referring to FIG. 1, which shows a refrigerant compressor according to this invention, the compressor comprises a housing 11 having a cylinder block 11A in one end thereof and a hollow portion 11B at the other.

The hollow portion 11B mounts a front cover plate 12 by means of screws and the cylinder block 11A mounts a cylinder head 13 and a valve plate 14 by means of bolts 15 to complete a closed housing assembly for the compressor.

The cylinder block 11A is formed with a plurality of cylinders 16, in which pistons 17 are slidably fitted, respectively.

In the hollow portion 11B, a wedge-shaped rotor 18 and a wobble plate 19 are disposed. The rotor 18 is secured on a drive shaft 20 which is borne by a journal bearing 21 in the front cover plate 12, and thus the rotor 18 is rotated by the rotation of the shaft 20.

The front cover plate 12 is formed with a shaft seal cavity 22, in which a shaft seal assembly 23 is mounted to seal the shaft 20 extending in the cavity 22.

The wobble plate 19 is connected with all pistons 17 by connecting rods 24. As disclosed in above U.S. patent, the wobble plate 19 is maintained against rotation in the housing. A pair of intermeshing gear-like elements 25, 25' is shown but the cross-axis mechanism disclosed in U.S. Pat. No. 3,761,202 may be employed.

Thus, by the rotation of the shaft 20, all pistons 17 are reciprocated in respective cylinders 16, in a known manner.

Between the rotor 18 and the front cover plate 12, an anti-friction thrust bearing assembly 26, such as of a roller or needle bearing type, is mounted and a gap 27 is provided thereby about the shaft 20.

A second gap 28 is provided between the rotor 18 and the wobble plate 19 by the provision of a second anti-friction thrust bearing assembly 29 therebetween.

The cylinder head 13 is formed with a suction chamber 131 and a discharge chamber 132 which are partitioned by a wall 133, as well known in the prior art.

The valve plate 14 is formed with suction and discharge openings 141 and 142 in registry with the suction and discharge chambers 131 and 132, respectively, and in registry with each cylinder 16. The valve plate 14 is provided with suction reed valve 143 and discharge reed valve 144 as well known in the prior art.

In operation, the drive shaft 20 is rotated by the motor of the vehicle through suitable power transmitting means (not shown). The wedge-shaped rotor 18 is rotated together with the shaft 20 to cause the non-rotatable but wobbling motion of the wobble plate 19, so that pistons 17 are reciprocated in their respective cylinders 16 in different phase of reciprocating motion from one another. By the reciprocation of the pistons, refrigerant gas is sucked into, and discharged from, the cylinders.

The essential structure and operation of the compressor to the shown in FIG. 1 and above described, are similar as compressors shown in the above described U.S. patents.

But this invention is characterized by the structure which is described hereinafter.

The front cover plate or the end plate 12 is formed with an annular recess 121 in the inner end surface and around a hub portion 122 thereof in which the drive shaft 20 is borne.

The rotor 18 is also formed with an annular recess 181 in an end surface facing the inner end surface of the end plate 12. The recess 181 defines a space together with the recess 121 in which the bearing assembly 26 is disposed.

Furthermore the rotor 18 is formed with another annular recess 182 in the inclining or angular end surface thereof.

The wobble plate 19 is also formed with an annular recess 191 in an end surface thereof facing the angular surface of the rotor 18. The recess 191 and the recess 182 define a space in which the second bearing assembly 29 is disposed.

Figure 2:
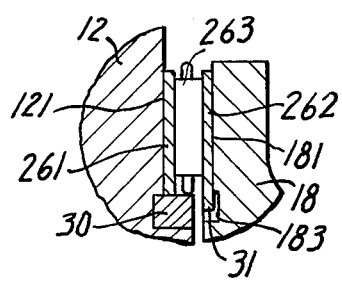
FIG. 2 shows an enlarged sectional view of section A in FIG. 1.

Referring to FIGS. 1 and 2, the first anti-friction thrust bearing assembly 26 comprises two annular race members 261 and 262 and a needle roller cage assembly 263. The race member 261 and the needle roller cage assembly 263 are seated in the annular recess 121 of the end plate 12.

In the annular recess 121, a ring member 30 of a wear-resistant material is disposed, which is close-fitted around the hub portion 122 of the end plate 12. The race member 261 and the needle roller cage assembly 263 are thereby prevented from any displacement in a radial direction and from wearing out the hub portion 122.

Figure 3:
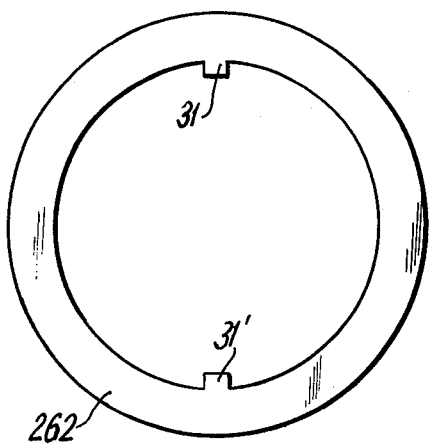
FIG. 3 shows an end view of a race member used in the needle thrust bearing assembly in FIG. 2 and FIG. 5.
Figure 4:
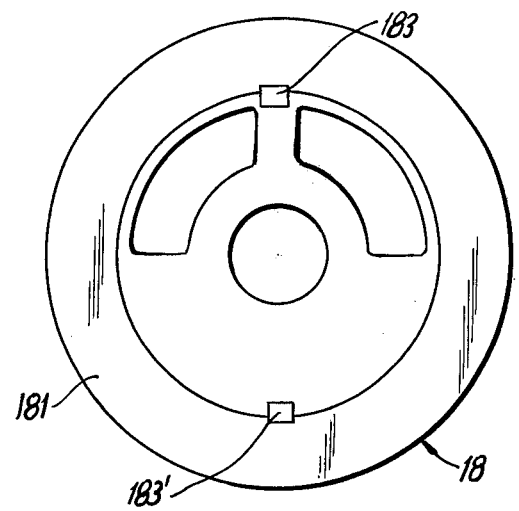
FIG. 4 shows an end view of the wedge-shaped rotor member in FIG. 1.

The other annular race member 262 which is seated in the recess 181 of the rotor 18, is seated on the rotor 18 is formed with a plurality of (two in the drawing) bosses or projections 31 and 31' which extend from a radial inner edge thereof at different and angularly spaced positions, as shown in FIG. 3. On the other hand, as shown in FIG. 4, the rotor 18 is formed with two depressions 183 and 183' in the surface facing the inner surface of the end plate 12, which depressions are for receiving the bosses 31 and 31' to prevent the race member 262 from rotating in the recess 181.

As clearly noted from above descriptions and drawings, the annular recess 121 of the end plate 12 is deeper than the other annular recess 181 of the rotor 18 and has a sufficient depth such that the needle roller cage assembly 263 is partially contained within the recess 121 besides the race member 261.

Figure 5:
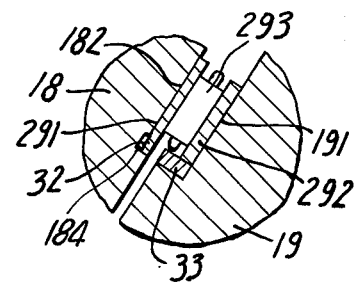
FIG. 5 shows an enlarged sectional view of section B in FIG. 1.

Referring to FIG. 5, the second anti-friction thrust bearing assembly 29 comprises, also, two annular race members 291 and 292 and a needle roller cage assembly 293. The annular race member 291 is seated in the annular recess 182 formed in the angular surface of the rotor 18. The member 291 is formed with bosses 32 similar to the race member 262 shown in FIG. 3, which bosses are received in respective depressions 184 in the angular surface of the rotor 18. The race member 291 is prevented from any radial displacement and any rotating movement.

The other race member 292 and the needle roller cage assembly 293 are disposed in the recess 191 of the wobble plate 19.

The annular recess 191 is, similar to the annular recess 121 of the end plate 12, provided with another ring member 33 of a wear-resistant material which is close-fitted around an annular wall which defines the recess 191, so that the race member 292 and the needle roller cage assembly 293 are prevented from any radial displacement and from wearing out the wobble plate 19.

The annular recess 191 is also deeper than the other annular recess 182.

In the embodiment in FIGS. 1-5, the end plate 12, the rotor 18 and the wobble plate 19 are clearly understood to be protected from any wear during operation of the compressor. Accordingly, the rotor, the wobble plate and the end plate are permitted to be made of soft and light material such as aluminum, so that the compressor may be reduced in the weight.

Each race member is of a wear-resistant material, for example, a carbon tool steel. Each ring member may be of a cast iron which was subjected to a surface hardening treatment.

Figure 6:
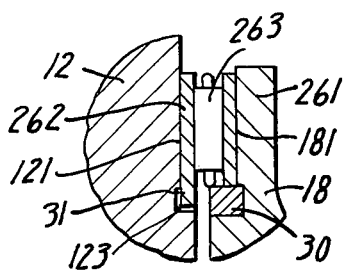
FIG. 6 shows an enlarged sectional view of a similar section as FIG. 2 in another embodiment of this invention.
Figure 7:
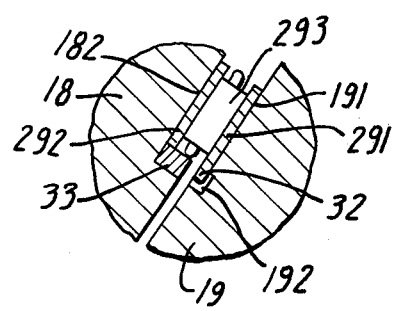
FIG. 7 shows an enlarged sectional view of a similar section as FIG. 5 in another embodiment.

In a modification of the embodiment in FIG. 1, the annular recess 181 of the rotor 18 is rather formed deeper than the other annular recess 121 of the end plate 12 so that the needle roller cage assembly 263 may be partially disposed within the race 181, as shown in FIG. 6. Furthermore, the annular recess 182 of the rotor 18 may be formed deeper than the other annular recess 191 of the wobble plate 19, as shown in FIG. 7. In the modification, the ring members 30 and 33 are provided on the rotor 18, and depressions are formed in the end plate 12 as shown by 123 and in the wobble plate 19 as shown by 192. Accordingly, the race member 261 having bosses as shown in FIG. 3 is seated on the end plate 12, and the race member 291 of the second bearing assembly is seated on the wobble plate 19.

Figure 8:
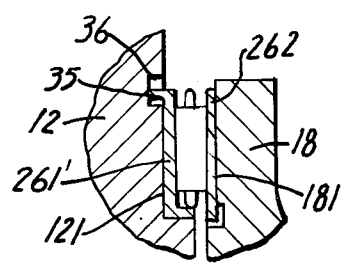
FIG. 8 shows an enlarged sectional view of a similar section as FIG. 2 in a further embodiment.
Figure 9:
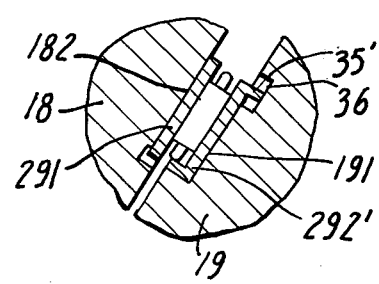
FIG. 9 shows an enlarged sectional view of a similar section as FIG. 5 in a further embodiment.

FIGS. 8 and 9 illustrate another embodiment of this invention, which has a similar structure of the embodiment in FIGS. 1-5 except that the race member 261 and the ring member 30 in FIG. 2 are integrated as one body to form a flanged race member 261' and the race member 292 and the ring member 33 in FIG. 5 are also integrated as one body to form a flanged race member 292'.

Figure 10:
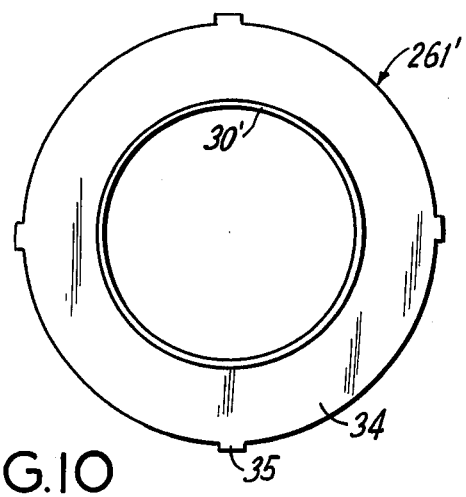
FIG. 10 shows an end view of the race member used in FIG. 8 and FIG. 9.
Figure 11:
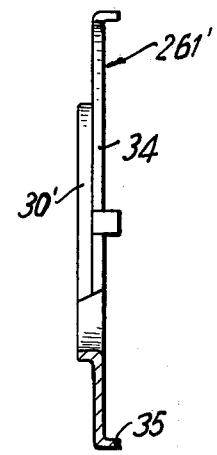
FIG. 11 shows a partially sectional side view of the race member in FIG. 10.

Referring to FIGS. 10 and 11, each of the flanged race members 261' and 292' (only member 261' is shown in the drawing) consists of a race member portion (34 in FIGS. 10 and 11), an axially extending annular flange (30' in FIGS. 10 and 11) from a radial inner edge of the race member portion and projections (35 in FIGS. 10 and 11) which axially extend from a radial outer edge of the race member portion at different and angularly spaced positions. These projections are for preventing the flanged race members 261' and 292' from any rotating movement in respective recesses 121 and 191, as shown in FIGS. 8 and 9.

As seen in FIGS. 8 and 9, projections 35 of the flanged race member 261' are received in respective depressions 36 formed in the bottom surface of the annular recess 121, and projections 35' of the flanged race member 292' are, similarly, received in respective depressions 36' formed in the bottom surface of the annular recess 191, so that these flanged race members may be prevented from rotating in respective annular recesses.

Each of flanged race members 261' and 292' is formed of a wear-resistant material, such as a carbon tool steel.

In the embodiment as shown in FIGS. 8-11, the life time of the compressor is prolonged similarly as in previous embodiments because the end plate 12, the rotor 18 and the wobble plate 19 are protected from wearing during the operation of the compressor. But this embodiment is superior to previous embodiments in the simplicity of its assembly and in the protection from wearing because the number of used parts is reduced and because flanged race members 261' and 292' are prevented from any rotating displacement.

Figure 12:
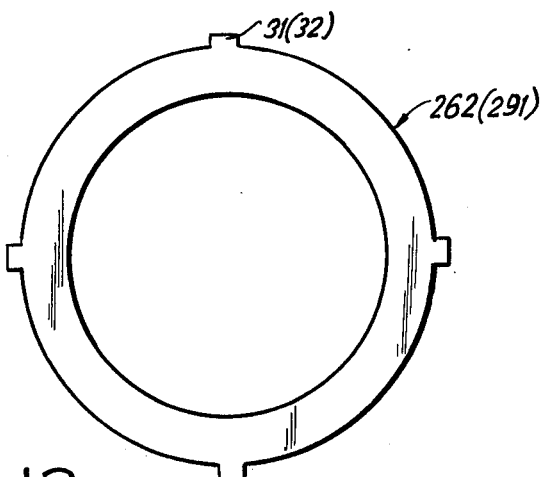
FIG. 12 shows an end view of a modified race member used in place of the race member in FIG. 3.
Figure 13:
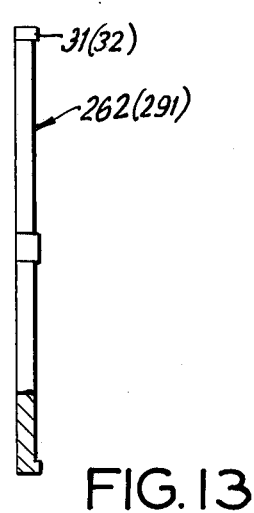
FIG. 13 shows a partially sectioned side view of the race member in FIG. 12.

Race members 262 and 291 in the above embodiments may also be formed as shown in FIGS. 12 and 13. Namely bosses 31 and 32 provided to race members 262 and 291 may be formed at not radial inner edges but radial outer edges of the members and the number of bosses may be optional, for example, four as shown in FIGS. 12 and 13. In such a case, depressions (183 and 184 in FIGS. 2 and 5) must be changed in the number and location thereof to be engaged with those bosses.

The invention has been described in detail in conjunction with preferred embodiments, which do not restrict this invention but various modifications and designations will be made by those skilled in the art in the scope of this invention.

What is claimed is:

1. A refrigerant compressor in which pistons are reciprocated within respective cylinders by a wobble plate member driven by a wedge-shaped rotor member secured on a drive shaft, a generally cylindrical housing which contains said wobble plate member and said wedge-shaped rotor, a first end plate defining a discharge chamber having inlet and outlet means mounted on one end of said housing, a second end plate mounted on, and closing, an opposite end of said housing, said drive shaft being rotatably borne in said second end plate and extending from the exterior to interior of said housing, said wedge-shaped rotor member being mounted and fixed on an inner end portion of said drive shaft to be rotated together with said drive shaft, a first anti-friction thrust bearing assembly being mounted between an inner end surface of said second end plate and one end surface of said wedge-shaped rotor member and within a first annular space defined by a first annular recess formed in said inner end surface of said end plate and a second annular recess formed in said one end surface of said wedge-shaped rotor member, said wobble plate member being closely mounted, and relatively rotatably borne, on the other end surface of said wedge-shaped rotor member, said other end surface being formed to incline to said drive shaft, and a second anti-friction thrust bearing assembly mounted between said inclining end surface of said wedge-shaped rotor member and an end surface of said wobble plate member facing said inclining end surface and within a second annular space which is defined by a third annular recess formed in said inclining surface of said wedge-shaped rotor member and a fourth annular recess formed in said end surface of said wobble plate member, the improvement which comprises: each of said first and second anti-friction thrust bearing assemblies comprising first and second race members and a rolling element cage assembly, one of said first and second race members and said rolling element cage assembly of said first bearing assembly being mounted in one of said first and second annular recesses, said one of said first and second recesses being formed of a sufficient depth such that radial displacement of said race member and said rolling element cage assembly mounted therein is prevented, a first ring member of a wear-resistant material provided in said one of said first and second annular recesses and covering a radial inner wall defining said one of said annular recesses, the other of said first and second race members of said first bearing assembly being mounted in the other of said first and second annular recesses which is formed of a relatively shallow depth such that radial displacement of said other race member mounted therein is prevented, first means for preventing said other race member of said first bearing assembly from rotation in said other annular recess, one of said first and second race members and said rolling element cage assembly of said second bearing assembly being mounted in one of said third and fourth annular recesses which is formed of a sufficient depth such that radial displacement of said race member and rolling element cage assembly mounted therein is prevented, a second ring member of a wear-resistant material therein which covers a radial inner wall defining said one annular recess, said other race member of said second bearing assembly being mounted in the other of said third and fourth annular recesses which is formed of a relatively shallow depth such that radial displacement of said other race member mounted therein is prevented, and second means for preventing said other race member of said second bearing assembly from rotation in said other of said annular recesses, said first and second rotation-preventing means comprising projections axially extending from said other race members of said first and second bearing assemblies, respectively, said projections being respectively received in first and second grooves respectively formed in said other of said annular recesses in which said other race members of said first and second bearing assemblies are respectively mounted and which extend from said other of said annular recesses, respectively.

2. The refrigerant compressor as claimed in claim 1, in which each of said first and second anti-friction thrust bearing assemblies is a needle thrust bearing comprising two race members of wear-resistant material plates and a needle roller cage assembly.

3. The refrigerant compressor as claimed in claim 1, in which each of said first and second ring members is of cast iron which was subjected to a surface hardening treatment.

4. The refrigerant compressor as claimed in claim 3, in which said end plate, said wedge-shaped rotor member and said wobble plate member are of aluminum.

5. The refrigerant compressor as claimed in claim 4, in which each of said race members of said first and second thrust bearing assemblies is of a carbon tool steel.

6. The refrigerant compressor as claimed in claim 1, in which said first ring member and said one of said first and second race members of said first bearing assembly are integrally formed of a wear-resistant material as a first part of one body, and comprising first means for preventing said first part from rotating movement in the annular recess in which said part is disposed.

7. The refrigerant compressor as claimed in claim 6, in which said second ring member and said one of said first and second race members of said second bearing assembly are integrally formed of a wear-resistant material as a second part of one body, and comprising second means for preventing said second part from rotating movement in the annular recess in which said another part is disposed.

8. The refrigerant compressor as claimed in claim 7, in which each of said first and second anti-friction thrust bearing assemblies is a needle thrust bearing comprising a needle roller cage assembly and two race members of wear-resistant materials, one of said two race members comprising an annular flange which axially extends from a radial inner edge thereof to provide each one of said first and second ring members.

9. The refrigerant compressor as claimed in claim 8, in which said wear-resistant material is carbon tool steel, and each of said end plate, said wedge-shaped rotor member and said wobble plate member is formed of aluminum.

* * * * *